United States Patent
Gnadeberg et al.

[11] 3,984,818
[45] Oct. 5, 1976

[54] PAGING IN HIERARCHICAL MEMORY SYSTEMS

[75] Inventors: Jules Boris Gnadeberg; Louis Johan Zeckendorf, both of Beekbergen, Netherlands

[73] Assignee: U.S. Philips Corporation, New York, N.Y.

[22] Filed: Feb. 3, 1975

[21] Appl. No.: 546,396

[30] Foreign Application Priority Data
Feb. 9, 1974 Netherlands............... 7401804

[52] U.S. Cl. .......................................... 340/172.5
[51] Int. Cl.² ........................................ G06F 7/02
[58] Field of Search ............................. 340/172.5

[56] References Cited
UNITED STATES PATENTS

| | | |
|---|---|---|
| 3,601,812 | 8/1971 | Weisbecker .................. 340/172.5 |
| 3,611,315 | 10/1971 | Murano ........................ 340/172.5 |
| 3,701,107 | 10/1972 | Williams ....................... 340/172.5 |
| 3,786,427 | 1/1974 | Schmidt et al. .............. 340/172.5 |
| 3,854,126 | 12/1974 | Gray et al. .................... 340/172.5 |
| 3,866,183 | 2/1975 | Lange ........................... 340/172.5 |

Primary Examiner—Gareth D. Shaw
Assistant Examiner—G. I. Bartz
Attorney, Agent, or Firm—Frank R. Trifari; Daniel R. McGlynn

[57] ABSTRACT

A computer system comprising a storage configuration, including a main store, a buffer store of smaller capacity, and an associated address store. Means are provided so that when a byte or word of a word block is to be written in the main store from a processor or another portion of the system, the buffer store cooperates in the transfer operation, provided the relevant word block is present in the buffer store.

1 Claim, 3 Drawing Figures

PAGING IN HIERARCHICAL MEMORY SYSTEMS

The invention relates to a computer system, having at least one processor and a storage configuration, and including at least one slow main memory or store having a large storage capacity divided into word blocks, and at least one fast buffer store having a small storage capacity also divided into word blocks. The number of word blocks in the buffer store, however, is less than that of the main store. Furthermore, an address store is provided which is divided into a number of address blocks which equals the number of word blocks of the buffer store, it therefore being possible to store for each address block the address of a word block present in the buffer store. The address store is further provided with comparison means by which the address of a word block of a requested word can be compared with each address block, stored in the address store, corresponding to the word blocks present in the buffer store. The relevant word block in the buffer store is selectable in the case of correspondence; if the address does not correspond, the word block is selectable from the main store and is transferrable to the buffer store. The the relevant address is transferrable to an address block of the address store.

Computer systems featuring such hierarchical storage configurations are known in the art and permit better use of the processor speed. The speed of the buffer store is the same order of magnitude as the speed of the processor. The main store, being slower, can be very large without its price becoming prohibitively high. The buffer store permits one to increase the speed of read operations in the store of the computer system. The most relevant data is present in the buffer store, so that when this data is required by a processor, it can be fetched from the buffer store at high speed. In such a system, however, it also happens that data is to be transferred from a processor or from other parts of the system to the main store. This concerns new data or data which has been modified by processing. The main store in principle contains all the newest data. This is necessary since, in the case of a plurality of processors, this newest information should be available to each processor via its relevant respective buffer store. The contents of a buffer store are in principle determined by the contents of the main store. If old data is already present at the main store address of the data to be transferred from the processor or from other parts of the system, then this old data is erased. If this address is present in the address store, so that a location is reserved in the buffer store for this old data, it is possible to declare this address invalid, so that a location in the buffer store is vacated, or the new information is written for this address in the relevant location in the buffer store.

The main store as well as the buffer store is divided into word blocks. These word blocks, also referred to as pages, consist of a number of words, each of which in turn can consist of a number of portions or bytes. In general, a word block consists of a certain number of bytes. These bytes will often be 8-bits or octades, the particular data unit used in the processor.

A processor processes either one or a number of word portions of a whole word block at the time. Suppose that the processor wishes to transfer one or more word portions of a word block to the main store at the instant at which the processor has completed the operation on or processing of such a word block. If the selection in the main store is organized per word block and if, moreover, the old data is erased when a write operation takes place in the main store, the following sequence of steps must take place: selection of the relevant word block, followed by the reading of the word block, followed by the modification of the relevant word portion (or portions) of the word block, and finally writing the complete word block in the main store again. The initial reading is required to insure that during the write operation the old data of the word portions not to be modified is still available. Therefore, this read operation is an additional, comparatively time-consuming operation.

Disregarding the foregoing, the word portions of a word block are often protected against errors. In order to achieve this efficiently, it is known to reserve per word blocks a few bits which, depending on the bit pattern of a word block, have a value whereby the word block can be tested for errors and whereby these errors can even be corrected. If this test and this correction must be possible per word portion, a great many more bits, and hence substantially more storage space, will be required.

The foregoing means that when, for example, a processor wishes to write information, usually only one or two word portions of a whole word block, to the main store, the following sequence of steps must be take place: first selecting and reading the whole word block at the relevant address in the main store, subsequently modifying the relevant word portion (possibly word portions) and determining the test correction bits, and finally writing the entire word block back to the main store. However, since the main store has comparatively slow access time, this requires a comparatively large amount of time, and during this period the main store cannot be used by other requesting devices (other processors and/or peripheral equipment).

It is an object of the invention to reduce the busy time of the main store during a write operation from a processor or other parts of the system to the main store, thereby improving the performance of the computer system. The computer system according to the invention comprises means for decoding the word portion address code during a write operation whereby the word portion is identified within the storage configuration and, in the case of correspondence of the address of the word block including the word portion with an address in the address store, the word portion can be selected in the relevant word block of the buffer store and can be replaced by a new word portion. Means are also provided for writing the word block containing the word portion thus modified in the main store. As a result, as soon as a word block in which a word portion is to be modified is present in the buffer store, the read action in the main store is cancelled. The modification is directed directly to the buffer store and, since the buffer store is so much faster than the main store, a significant amount of time is saved. The word block, provided with the proper test/correction bits, is subsequently written in the main store over the old data present at the relevant address in one operation.

The buffer store may be constructed so that it can be independently read and written for each word portion of a word block, thereby saving still more time. To this end, another embodiment of a computer system according to the present invention teaches means for writing the word block comprising a modified word portion in the main store in the form of gates which, simultaneously with the replacement of a word portion to be modified in the buffer store and controlled by the decoding means, allow passage of the contents of a word portion not to be modified from the buffer store to the main store, and allow passage of a word portion to be modified directly to the main store. This means that in one cycle of the buffer store the word block, consisting of one or more modified word portions, becomes available for writing in the main store. Simultaneously, the relevant word block is then also present in the buffer store, including its new word portions, so that it is directly available again for further use in a processor.

The invention will be described in detail hereinafter with reference to some embodiments shown in the drawings.

Figure 1:
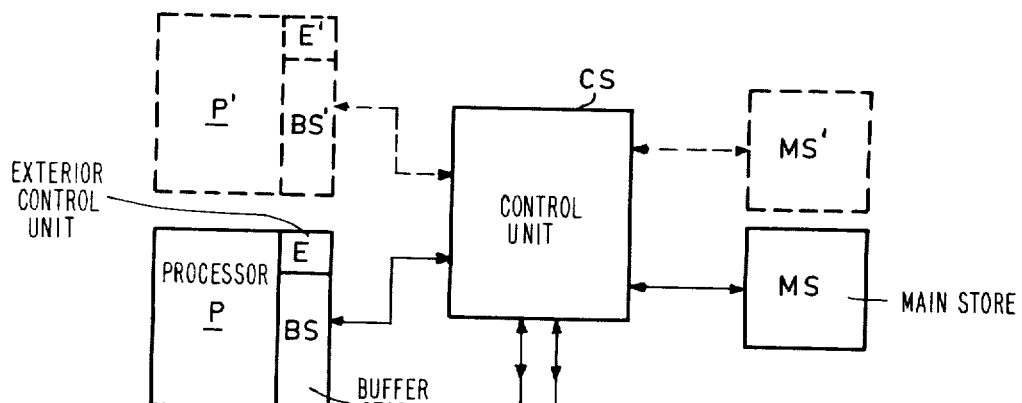
FIG. 1 shows a computer system according to the present invention in block diagram form.

FIG. 1 shows a computer system, comprising a processor P, a main store MS, a buffer store BS, a control unit CS and input/output facilities I/O. The buffer store BS permits better use of the speed of the processor P, in spite of the limitation imposed by the use of a comparatively slow large main store MS. The reference CS in FIG. 1 denotes the control unit which controls all traffic between the stores, the processor and the "exterior", denoted by I/O. The reference E denotes a control unit which serves for the control between the processor and any other parts of the computer system and the buffer store when one or more word portions have to be written to the main store. The boxes shown in broken lines in FIG. 1 signify that in such a computer system further processors P' and/or further main stores MS', buffer stores BS' and control units E' may also be present.

Figure 2:
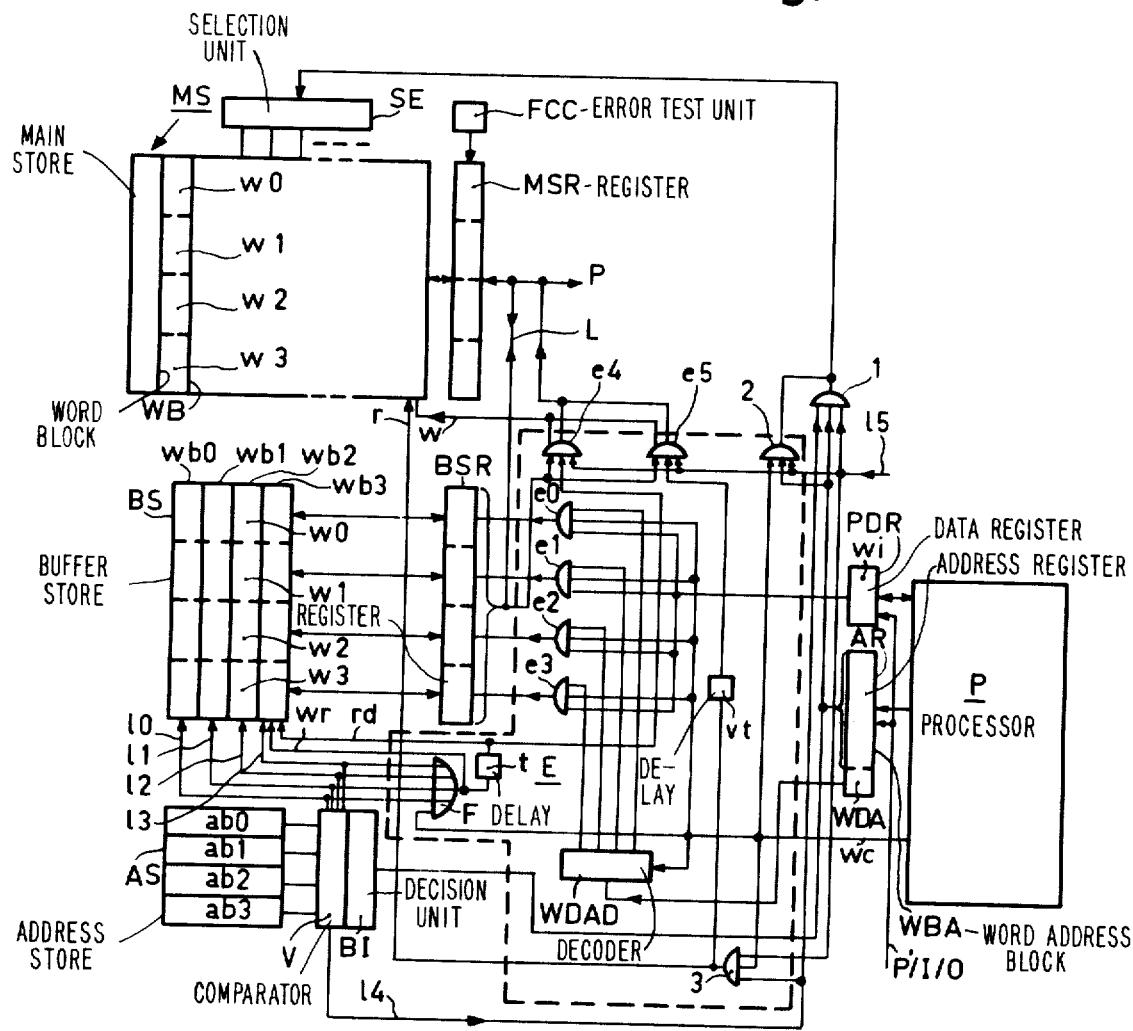
FIG. 2 shows first embodiment of a computer system according to the present invention.

FIG. 2 shows a first embodiment of the computer system according to the present invention. Therein, MS denotes the main store again, provided with a selection unit SE which enables a word block WB to be selected from the main store MS when a word address block WBA is applied in the address register AR. A word block WB is divided into a number of word portions $w0$, $w1$, $w2$ and $w3$. The writing/reading of the word block WB is effected via the input/output register MSR. The reference FCC denotes an error test code device in which bits for testing errors and the possible correction thereof in a word block are calculated. Error correction code techniques are known in the art and need not be further elaborated here. In this embodiment the buffer store BS comprises four word blocks, their location in BS being denoted by $wb0$, $wb1$, $wb2$ and $wb3$. This number four was chosen to keep the description simple. The input/output register of the buffer store is denoted by BSR. Furthermore, an address store is denoted by AS and a comparison device by V. Another set-up provides that the comparison means for the address store acts associatively with the address store itself.

The address store can contain as many addresses as there are word blocks stored in BS. The locations of these addresses, address blocks, are denoted by $ab0$, $ab1$, $ab2$ and $ab3$. In the comparison device V, an address WBA applied in register AR is compared to the addresses present in address store AS. This can be done for all addresses simultaneously, or one address after the other using less comparison logic. If AS is an associative store, this is done automatically for all addresses simultaneously. If one of the addresses corresponds, a relevant line 10, 11, 12 or 13 is energized, and the word block associated with the indicated address is selected in buffer store BS. The word block can be read to the processor (denoted by P) via line bundle L. However, if the word block WB having address WBA is not present in the buffer store BS, no correspondence is detected for this address WBA in device V; this is signalled on line 14, and the word block WB is selected from the main store. This is achieved by register AR via AND-function gate 1 which is activated by 14. Line 15 is shown to illustrate that the selection in MS can be effected only if there is no operation already being performed in the main store MS. If MS is free, 15 carries a 1-signal and also activates gate 1 to allow passage of the address WBA. This word block WB can then be written/read via register MSR. The following also takes place: the contents of the word block WB are also applied (via line bundle L) to BSR, since according to the principle of the present storage configuration, the word block must now be stored in the buffer store BS as being the last word block used. If BS is already fully occupied, a previously stored word block must be erased or, if necessary, even be removed therefrom and be transferred to the main store; the latter is the case if writing in a word block of the buffer store may take place without this being registered in the main store. Which of the stored word blocks is due in this respect, is determined in decision unit BI, in which the decision is made, for example, on the basis of a rule such as "first in, first out." Other feasible decision criteria are, for example: "most recently used" or "frequency of use." In order to enable such a decision to be made, the address blocks $abi$ in AS are provided with additional information bits. On the basis of the decision, an address block $abi$ in AS and the corresponding word block $wbi$ in BS are released, and the address WBA from register AR and the associated word block WB can be stored in address block $abi$ of AS and in word block $wbi$ of BS, respectively.

The control unit denoted by E in the system of FIG. 2 furthermore comprises, in accordance with the present invention, means WDAD for decoding the word portion address code WDA which indicates the individual word portions $w0$, $w1$, $w2$ and $w3$ of a word block $wbi$. The word portion address code originates from the address register AR. The decoder WDAD indicates the individual word portions via AND-function gates $e0$, $e1$, $e2$ and $e3$ via the input/output register BSR. In this embodiment the means for writing a word block containing a modified word portion in the main store consists of an AND-function gate $e4$, an AND-OR-function gate F, and a delay member $t$. There are also provided a command line $wc$, originating from the processor P, and command lines $w$ and $r$ connected to the main store. Command line $wc$ carries a 1-signal if the processor P wishes a word portion $wi$ to be written from a data register PDR to an address WBA/WDA, i.e., in a word block $wbi$ having the address WBA and the word portion address WDA thereof, of the main store. Command lines $w$ and $r$ serve to supply a write or read command, respectively, to the main store MS. Finally, there are provided AND-function gates $e5$, 2 and 3, lines $wr$, $rd$, $r$ and a delay member $vt$ which will be discussed hereinafter. Furthermore the address register AR and the data register PDR are provided with an input P'/I/O to show that addresses and word portions can be applied from other processors P' and/or from the "exterior," such as peripheral equipment. To this end, line wc is also connected to this P'/I/O indication.

The operation of the computer system, including the control portion E, according to the present invention is as follows (the sake of simplicity, it is assumed that a write operation must take place from the processor P in the main store): assume that a word portion wi (for example, w2) of a word block WB (for example, wb1) having the word block address WBA and further the word portion address WDA is to be written from processor P to the main store. Processor P supplies wi in register PDR, the addresses in AR and, moreover, the command wc. Address WBA is compared in V with the address blocks in AS, and in this case corespondence occurs for ab1; this results in a 1-signal on l1, so that the word block wb1 in BS is selected. In AND-OR function gate F a 1-signal is passed via line wr because of the fact that one of the lines li (in this case l1) (OR-function) carries a 1-signal in combination with the presence (AND-function) of the command wc. BS is thus instructed to take over the contents of register BSR. However, register BSR will transfer only the contents of the portion for which BSR receives an instruction: the address portion WDA is decoded in decoder WDAD and thus prepares one of the AND-function gates e0, e1, e2 or e3 (in this example e2). Prepared by command wc, in this example, gate e2 transfers the word portion wi to register BSR. From BSR the word portion wi in this case arrives at the location w2 of wb1. Subsequently, a read command is applied from delay member t, also controlled by the output of gate F, to BS via line rd. Line l1 still carries a 1-signal, so the entire word block wb1 is then read to BSR. From BSR the entire word block is then transferred to the main store; if the main store is free, line 15 carries a 1-signal. Command wc is also present. The AND-function gate 2 is thus activated, and allows transfer of the address WBA of the relevant block wb1 to SE. At the same time, the AND-function gate e4, again activated by a 1-signal on 15 and also by a 1-signal from delay member t (thus indicating that a read operation is effected in BS, so that the word block wb1 arrives in BSR), opens the path between BSR and MSR. The contents of BSR thus arrive in MSR, and can be written in the main store MS. Writing is effected in this example on the basis of a 1-signal which is supplied to line w, being the write command line for MS, by AND-function gate e4. This is effected in the presence of a 1-signal on 15 and a 1-signal on the output of t.

In order to be complete, a description will be given of the case when a word block, having a word portion which is to be modified in the main store, is not present in the buffer store. If the address WBA of a word block WB is not present in the address store AS, line 14 carries a 1-signal. The gates 1 and 3 are thereby activated. If a 1-signal appears on line 15 to signify that the main store is free, gate 1 transfers the word block address WBA to the selection unit SE. The word block is selected in MS. Command wc is also applied to gate 3; if the 1-signal occurs on 15, gate 3 opens and supplies a 1-signal to line r, which means a read command for the main store. The word block WB is thus read to register MSR. In this example this word block also arrives in register BSR via line bundle L. However, on the basis of the decoding of the word portion address WDA in the decoder WDAD, one of the gates e0, e1, e2 or e3 forces the word portion wi out of the processor. In the relevant portion of register BSR a modification of a word portion of the word block therefore occurs. The word block thus formed can be taken up, as already described, in the buffer store. However, the primary objective is to write the word block to the main store. This is achieved as follows: as already stated, a read command is given by gate 3 for the main store via line r. This command produces, via delay member vt, a write command for the main store MS after some time (at least as much later as the time required for reading in the main store). This is not directly effected, but via AND-function gate e5 which also has line 15 connected thereto. If MS is still free, gate e5 opens and supplies a write command to MS via line w. At the same time, the gate e5 allows passage of the contents of BSR to MSR in order to be written in MS. The word block including a modified word portion is then present in the main store. It will be obvious that when such a word block is not present in the buffer store, the modification of a word portion thereof will definitely require more time than when it is present in the buffer store and use is made of the technique according to the present invention.

Figure 3:
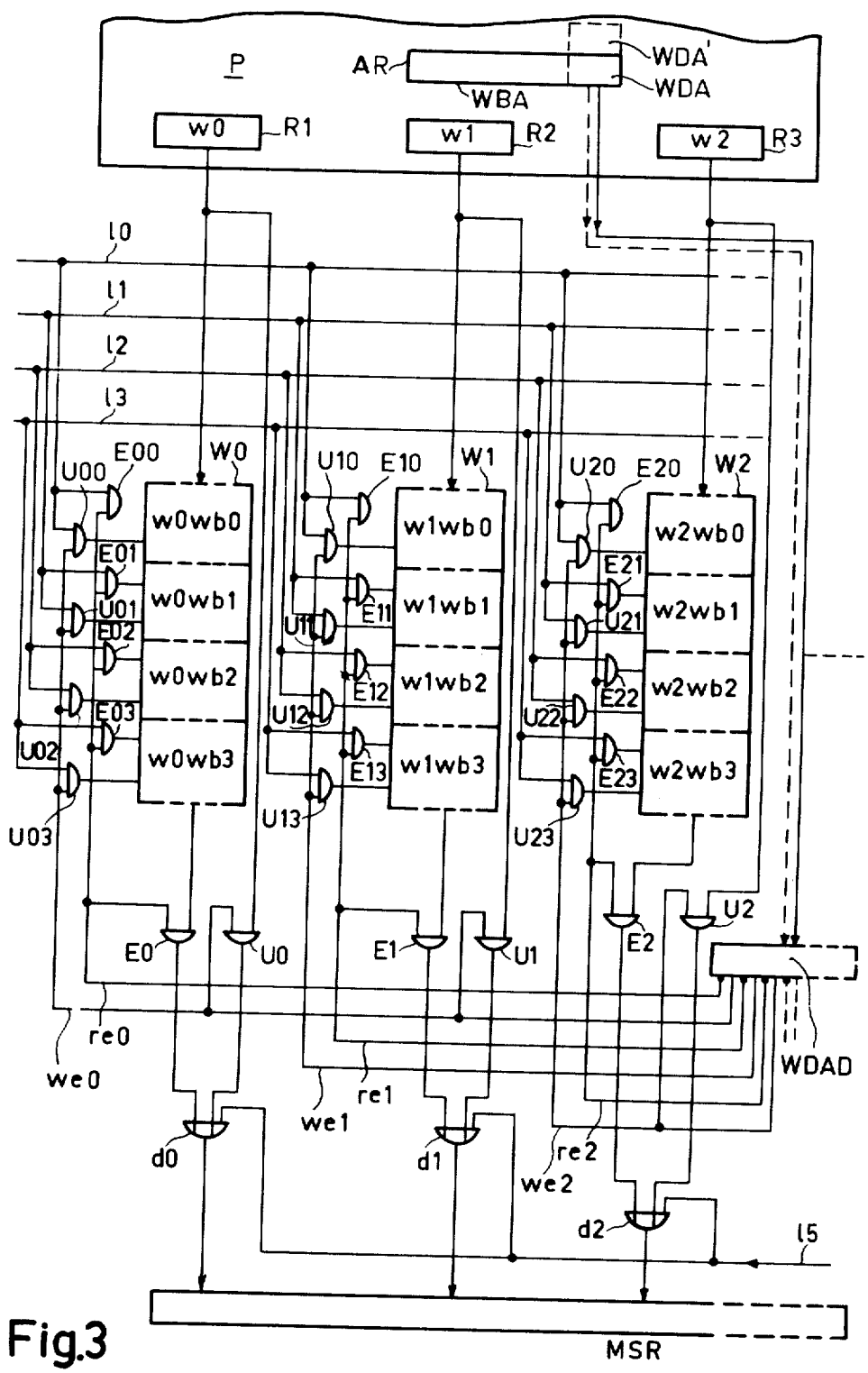
FIG. 3 shows a second embodiment of a computer system according to the present invention.

FIG. 3 shows how further time can be gained when a word block having one or more word portions to be modified is present in the buffer store. The buffer store BS is shown in separate portions in this Figure. The word block wbi (wb0, wb1, wb2 and wb3) is shown to be distributed over sections W0, W1 and W2. Each section Wi constitutes the storage space for a word portion wi (w0, w1, w2 . . . ) of a word block wbi: w0wb0, w1wb0, w2wb0, . . . . w0wb1, w1wb1, w2wb1, . . . w0wb2, w1wb2, w2wb2, . . . . In this buffer store reading and writing for each section, is possible, i.e., for each word portion of a word block which i.e. writing can take place in a word portion wi while, simultaneously reading takes place in a word portion wj. There are also provided AND-function gate circuits E0, E1, E2 and 40, 41, 42 and AND-OR-function gates d0, d1, d2 (for replacement of a word portion to be modified of a word block in the buffer store) and AND-function gates E00, E10, E20, . . . , E01, E11, E21, . . . , E02, E12, E22, . . . , E03, E13, E23, . . . and U00, U10, U20, . . . , U01, U11, U21, . . . U02, U12, U22, . . . U03, U13, V23, . . . , controlled from the decoder WDAD. These respective gates allow passage of the contents of a word portion which is not to be modified from the buffer store to the main store, or direct passage of a word portion to be modified to the main store, at the same time modification takes place in the buffer store. The operation is better described as follows: assume that a word portion wi (this may be one word portion, but also, for example, two) of a word block having the address WBA, the word portion then having the word portion address WDA, is to be applied from a register Ri (R1, R2, R3, . . . ) of processor P to the main store. (For example, if two word portions of the word block WB are to be removed, a word portion address WDA' will also be present). As was already described in detail in the foregoing, it is established whether WBA is present in the address store AS (FIG. 2); if this is so, one of the lines 10, 11, 12 or 13 carries a 1-signal. These lines are connected to said gates Eij and Uij. For example, if line 12 carries a 1-signal, the gates E02, U02, E12, U12, E22, U22, . . . are activated. The word porion address WDA is decoded in WDAD and produces a 1-signal on one of the lines U0. for example, we0 because word portion w0 is modified). The lines rei carry a 1-signal, with the exception of re0 which carries a 0-signal (signals on wei and rei are each others' complement). In this situation, gate U02 is open and applies a write command to section W0 for the word portion w0wb2. The contents w0 of the register R1 are thus written in location w0wb2 of section W0. w0 is also present on gate Uo. U0 is prepared by the 1-signal on we0, with the result that word portion w0 arrives in the register MSR of the main store via AND-OR function gate d0, provided that d0 is prepared by a 1-signal on line 15 to signify that the main store is free. Also open in this situation are the gates E12 and E22 (12 and re1 and re2 carry a 1-signal). The contents of w1wb2 of section W1 and of w2wb2 of section W2 are thus read; w1wb2 is transported to the relevant location (of word portion w1) in register MSR via gate E1, also activated by a 1-signal on re1, and further via AND-OR function gate d1 (a 1-signal on 15). Similarly, w2wb2 is transferred, via gate E2 which is activated by a 1-signal on re2, and further via AND-OR function gate d2 (a 1-signal on 15), to the relevant location in register MSR.

It follows from the foregoing description that in one cycle of the buffer store the word block (in this case wb2) with a word portion to be modified (in this case w0) becomes available for writing to the main store in the register MSR.

What is claimed is:

1. A data processing arrangement including a processor and a storage configuration including a first and a relatively faster second store, wherein data is organized in each of said stores in at least one data class and wherein each data class is composed of at least one word block having a predetermined number of words of data, each having a plurality of word portions, the number of words in said second store being less than the number of words in said first store, comprising first means for supplying a predetermined word block address of a predetermined word block for addressing individual word blocks within said storage configuration;

second means for storing said predetermined word block address;

third means for storing addresses of word blocks stored in said second store;

fourth means for comparing said stored predetermined word block address with said addresses stored in said third means, and for producing a selecting signal if said stored predetermined word block address does not correspond with said addresses stored in said third means;

fifth means responsive to said selecting signal for effecting a transfer of said predetermined word block from said first store to said second store;

sixth means responsive to said selecting signal for effecting a transfer of said predetermined word block address from said first means to said third means; and seventh means for supplying the individual word portions of the predetermined word block corresponding to said predetermined word block address to the input/output register of said second store; and eighth means responsive to the processor for writing a modified word portion in a word block in said second store.

* * * * *

UNITED STATES PATENT AND TRADEMARK OFFICE
CERTIFICATE OF CORRECTION

PATENT NO. : 3,984,818
DATED : October 5, 1976
INVENTOR(S) : JULES B. GNADEBERG ET AL It is certified that error appears in the above—identified patent and that said Letters Patent are hereby corrected as shown below:

Column 1, line 41, "by processing" should be --by processing operations--

Column 7, line 2, "lines U0." should be --lines wei--

Signed and Sealed this sixteenth Day of August 1977

[SEAL]

Attest:

RUTH C. MASON
Attesting Officer

C. MARSHALL DANN
Commissioner of Patents and Trademarks